United States Patent
Levy et al.

(10) Patent No.: US 12,454,019 B2
(45) Date of Patent: Oct. 28, 2025

(54) SYSTEMS AND METHODS FOR AUTOMATED CUTTING OF LUMBER

(71) Applicant: BotBuilt, Inc., Durham, NC (US)

(72) Inventors: Daniel Levy, Durham, NC (US); Christopher Barrett Ames, Durham, NC (US); Dylan Vassily, Durham, NC (US); David Miron, Durham, NC (US)

(73) Assignee: BotBuilt, Inc., Durham, NC (US)

( * ) Notice: Subject to any disclaimer, the term of this patent is extended or adjusted under 35 U.S.C. 154(b) by 0 days.

(21) Appl. No.: 18/780,364

(22) Filed: Jul. 22, 2024

(65) Prior Publication Data

US 2024/0383056 A1 Nov. 21, 2024

Related U.S. Application Data

(63) Continuation of application No. 18/668,035, filed on May 17, 2024.
(Continued)

(51) Int. Cl.
*B23D 59/00* (2006.01)
*B23D 47/04* (2006.01)

(52) U.S. Cl.
CPC ......... *B23D 59/001* (2013.01); *B23D 47/042* (2013.01); *B23D 59/008* (2013.01)

(58) Field of Classification Search
CPC ......... B27B 1/007; B27B 25/00; B27B 25/02; B27M 1/08
See application file for complete search history.

(56) References Cited

U.S. PATENT DOCUMENTS

| | | | | |
|---|---|---|---|---|
| 5,934,347 A | * | 8/1999 | Phelps | B27M 3/002 144/380 |
| 6,120,628 A | * | 9/2000 | Pritelli | B27M 3/002 156/266 |

(Continued)

FOREIGN PATENT DOCUMENTS

WO    WO-2022/183037 A1    9/2022

OTHER PUBLICATIONS

International Search Report and Written Opinion for International Patent Application No. PCT/US2024/030103, dated Jul. 16, 2024.
(Continued)

*Primary Examiner* — Matthew Katcoff
(74) *Attorney, Agent, or Firm* — Goodwin Procter LLP

(57) ABSTRACT

Systems and methods for automated cutting of lumber are disclosed. The system includes a loading module that receives lumber from a loading area and places the lumber on a cutting table. The system includes an actuating module that receives the lumber from the loading module, inspects the lumber, records lumber information based on the inspection, and positions the lumber on the cutting table in preparation for cutting. The system includes a sensor module that detects the position of the lumber on the cutting table, and records the position to the lumber information. The system includes a computing module that analyzes the lumber information received from the actuating module and sensor module. The system includes a cutting module that cuts the lumber based the lumber information, the cutting resulting in cut lumber. The system includes an unloading module that places the cut lumber on an unloading area.

20 Claims, 12 Drawing Sheets

Related U.S. Application Data

(60) Provisional application No. 63/502,879, filed on May 17, 2023.

(56) References Cited

U.S. PATENT DOCUMENTS

| | | | | |
|---|---|---|---|---|
| 6,240,821 | B1* | 6/2001 | Landers | B27B 31/06 |
| | | | | 83/419 |
| 7,857,021 | B2* | 12/2010 | Boyd | B27B 31/06 |
| | | | | 144/404 |
| 8,109,302 | B2* | 2/2012 | Borne | B27B 31/06 |
| | | | | 144/1.1 |
| 8,281,696 | B2* | 10/2012 | McAdoo | B27B 25/02 |
| | | | | 83/424 |
| 10,139,814 | B2* | 11/2018 | Colon | B27M 1/08 |
| 10,406,613 | B2* | 9/2019 | Wilkins | B23D 47/04 |
| 2004/0069106 | A1 | 4/2004 | McAdoo | |
| 2014/0238546 | A1* | 8/2014 | Barker | B27B 31/06 |
| | | | | 144/357 |
| 2024/0383054 | A1 | 11/2024 | Levy et al. | |

OTHER PUBLICATIONS

Jonathan Katz-Moses (Video entitled "Which Table Saw Blade to Use at 19,000 Frames Per second—Never Before Seen Footage", premiered on Oct. 18, 2020, https://www.youtube.com/watch?v=4m8T3i982E8, herein after Jonathan Katz-Moses) (Year: 2020).

Kalpakjian, Serope, Schmid, Steven, (Published on Jul. 27, 2007). Manufacturing Processes for Engineering Materials (5th Edition), Published by: Pearson ISBN: 0132272717, (Year: 2007).

Naylor, A., Hackney, P., Perera, N., and Clahr, E. (May 22, 2012). "A predictive model for the cutting force in wood machining developed using mechanical properties," Published by BioResources, 7(3), 2883-2894.

* cited by examiner $F_a$: Applied force by the piston.
$F_g$: Force due to the weight of the wood board.
V: Speed of the wood translating into the x-axis.
$r_d$: Radius of the drive roller. 616
$F_{fx}$: $\mu(F_g+F_a)$, $\mu = 0.6$ as one exemplary value. Friction force caused by the weight of the wood board $F_g$, and the applied force by the piston $F_a$.
$\tau$: $F_{fx} \cdot r_d$ Torque to overcome friction. 620

SYSTEMS AND METHODS FOR AUTOMATED CUTTING OF LUMBER

CROSS-REFERENCE TO RELATED APPLICATIONS

This application is a continuation of U.S. patent application Ser. No. 18/668,035, filed May 17, 2024, which claims priority to and the benefit of U.S. Provisional Application No. 63/502,879 titled "Systems and Methods for the Automated Cutting of Lumber" and filed May 17, 2023 which is incorporated herein by reference in its entirety.

TECHNICAL FIELD

The present disclosure generally relates to systems and methods for automated cutting of lumber, and more specifically, robotic and/or automated systems and methods for cutting lumber used in residential home and/or industrial building construction.

BACKGROUND

Residential home and/or industrial building construction can often be dependent on slow, inefficient, rigid, expensive and manual conventional construction techniques. Some fundamental operations used in construction of a residential home and/or industrial building can be manual labor intensive and imprecise. Furthermore, conventional construction materials can be limited to specific size requirements, and can also be pre-formed offsite, and when received at the construction site, may not fit or meet the specifications required for its intended use. Additionally, conventional construction techniques that are used for forming such conventional construction materials are often performed offsite from the construction site, or if performed onsite, are manual labor intensive. In a specific example, conventional preparation and/or cutting of wood for use in residential home and/or industrial building construction can be a manual process, requiring a lot of human input and can produce imperfections in the wood panel product.

The foregoing discussion, including the description of motivations for some embodiments of the invention, is intended to assist the reader in understanding the present disclosure, is not admitted to be prior art, and does not in any way limit the scope of any of the claims.

SUMMARY

Systems and methods for automated cutting of lumber are presented. In some embodiments, an automated cutting system can include a loading module that receives lumber from a loading area and places the lumber on a cutting table. In some examples, the system can include an actuating module that receives the lumber from the loading module, inspects the lumber, records lumber information based on the inspection, and positions the lumber on the cutting table in preparation for cutting. The system can include a sensor module that detects the position of the lumber on the cutting table, and records the position to the lumber information. The system can include a computing module that analyzes the lumber information received from the actuating module and sensor module. The system can include a cutting module that cuts the lumber based the lumber information received from the computing module. The cutting resulting in cut lumber. System can include an unloading module that places the cut lumber onto an unloading area.

Various embodiments of the system can include the actuating module including a drive roller that moves the lumber along the cutting table to position the lumber for cutting. In some embodiments, the actuating module can include a clamp roller that guides the lumber along the cutting table to position the lumber for cutting. In some examples, the loading and/or unloading module can include a robot arm. The actuating modules can include at least one of a rack and pinion, a rail, a conveyor, rollers, driver rollers, clamp rollers, passive clamp rollers, a piston, or a robot arm. The sensor module can include at least one of an optical detector, a photoelectric sensor, an encoder, a linear encoder, or a rotary encoder. The cutting module can include at least one of a saw, a circular saw, a cutter, or a robot cutter. The cutting table can include the actuating module, the sensor module, computing module, cutting module, labeling module, sawdust collecting module, among other modules. The actuating module can move the lumber along a lateral axis of the cutting table to secure the lumber for cutting. The computing module can control each of the loading and/or unloading module, the actuating module, the sensor module, computing module, cutting module, labeling module, and/or the sawdust collecting module.

A method for automatically cutting lumber is presented. In some embodiments, the method can include providing an automated cutting system configured to perform the steps of loading lumber received from a loading area, inspecting the lumber to generate lumber information corresponding to the lumber, positioning the lumber in preparation for cutting, cutting the lumber to form cut lumber based on the lumber information, inspecting the cut lumber to generate cut lumber information corresponding to the cut lumber, and unloading the lumber to an unloading area.

A method for automatically cutting lumber is presented. In some embodiments, the method can include loading lumber received from a loading area. In some examples, the method can include inspecting the lumber to generate lumber information corresponding to the lumber. The method can include positioning the lumber in preparation for cutting. The method can include cutting the lumber to form cut lumber based on the lumber information. The method can include inspecting the cut lumber to generate cut lumber information corresponding to the cut lumber. The method can include unloading the lumber to an unloading area.

Various embodiments of the method can include loading lumber using a robot arm to pick-up and place lumber from a receiving area onto a cutting table. In some embodiments, the method can include inspecting the lumber, the inspecting including analyzing a label on the lumber and generating the lumber information based on the label. In some examples, the method can include positioning the lumber on a cutting table in preparation for cutting the lumber. The method can include cutting the lumber using a circular saw to cut the lumber into cut lumber. The cut lumber information includes a size and shape of the cut lumber. The method further includes applying a label to the cut lumber subsequent to cutting. The method can include collecting sawdust generated during the cutting.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
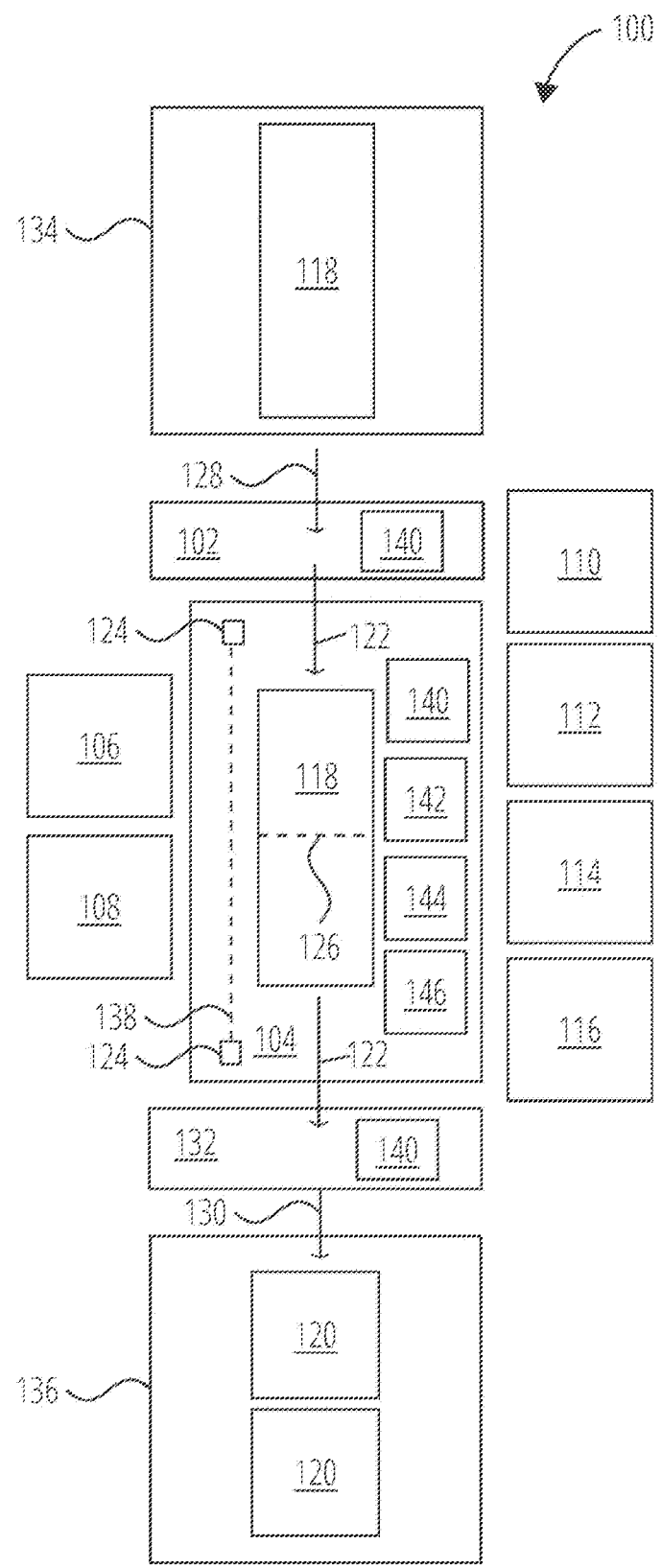
FIG. 1A illustrates a block diagram for an automated cutting system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The present disclosure generally relates to systems and methods for automated cutting of lumber. In some embodiments, the systems and methods can include automated systems and methods for cutting and preparing lumber to be used in residential, commercial, and/or industrial construction applications. The fast, efficient, flexible, and/or cost-effective, systems and methods for automatically creating lumber-based components to be used in residential, commercial, and/or industrial construction. Systems, processes and/or techniques are presented that provide for simplification, and/or decreasing construction time of residential homes, commercial office spaces, and/or industrial buildings. In some examples, systems and techniques for reliably and repeatedly forming construction of lumber-based components are presented. The systems and methods are configured to reduce human input, e.g., to autonomously handle and control loading, cutting, and/or processing lumber with minimal human intervention, e.g., providing for a fully automated process.

As described herein, the term lumber can be used to refer to wood, treated wood, wood panel, wood plank, wood board, wood stud, stud, truss, and/or any type of wood which can be used for residential, commercial and/or industrial construction applications. In some examples, the terms lumber, wood, treated wood, wood panel, wood plank, wood board, wood stud, stud, truss, as used herein, can be used interchangeably. In some examples, wood panels can be used to describe fully assembled wall sections of a house (e.g., a finished wall and/or wall panel for a house). Similarly, as described herein, lumber, wood, treated wood, wood panel, wood plank, wood board, wood stud, stud, truss, and/or any type of wood can refer to a single piece of lumber and/or wood, or multiple pieces of lumber and/or wood. The lumber can include wood having dimensions of approximately 2 inches×4 inches, 2 inches×6 inches, 2 inches×8 inches, 2 inches×10 inches, 2 inches×12 inches, among other dimensions and/or configurations. The lumber can include wood having dimensions of in a range of approximately 2 inches×1-12 inches, among other dimensions and/or configurations. In some implementations, the automated cutting system can be configured to receive wood having dimensions in a range of approximately 2 inches×1-12 inches as inputs.

In various embodiments, one or more automated cutting systems are described herein. As shown, like reference numbers used for features described can be used to represent the same or similar features.

Automated Cutting System for Lumber

Referring to FIG. 1A, a block diagram of an automated cutting system 100 for cutting and/or preparing lumber 118 is shown, according to some embodiments. In some embodiments, the automated cutting system 100 can include a loading module 102, a cutting table 104, an actuating module 106, a sensor module 108, a computing module 110, a cutting module 112, a labeling module 114, a sawdust collecting module 116, an unloading module 132, among other modules and/or systems. In some embodiments, the loading module 102 and the unloading module 132 can be the same module, e.g., a single module can be used for both loading and/or unloading. The loading module 102 and/or unloading module 132 can each include a robot, robot arm, and a conveyor, among other automation systems. The loading module 102 can receive and/or pick-up the lumber 118 from a loading area 134. The loading module 102 can provide the lumber 118 to the actuating module 106. The actuating module 106 can include a rack and pinion, a rail, a conveyor, a roller, driver rollers, clamp rollers, passive clamp rollers, a piston, and a robot arm, among other components. In some embodiments, the cutting table 104 can include the actuating module 106, the sensor module 108, the computing module 110, the cutting module 112, the labeling module 114, the sawdust collecting module 116, among other modules. In some examples, the cutting table 104 can include sensors 124, automation equipment 140, cutting equipment 142, labelling equipment 144, sawdust collecting equipment 146, among other components. Upon receiving the lumber 118 from the loading module 102, the actuating module 106 can move 122 the lumber 118 along a lateral axis of the cutting table 104 to secure and/or clamp the lumber 118 for cutting 126. In some examples, the actuating module 106 includes a drive roller that moves the lumber 118 along the cutting table 104 to position the lumber 118 for cutting. The actuating module 106 can include a clamp roller that, upon an initial push of the lumber 118 from a piston or other automation equipment, guides the lumber 118 along the cutting table 104 to position the lumber 118 for cutting. The sensor module 108 can include sensors 124 such as optical detectors, photoelectric sensors, encoders, linear encoders, rotary encoders, among other sensors, instruments, and/or detectors. The sensors 124 can be used to take measurements prior, during and subsequent to cutting 126 and/or processing the lumber 118. Each of the sensors 124 can be used alone or in tandem. The sensors 124 can be used and/or are configured to determine when lumber 118 reaches a location within the automated cutting system 100. In some examples, the sensors 124 can determine when lumber 118 reaches a particular position on the cutting table 104. As described herein, the sensor module 108 can also be referred to as a measurement system. The sensor module 108 can accumulate and/or organize sensor information received from the sensors 124, and relay the sensor information to the computing module 110. The sensor module 108 can inspect the lumber 118 and characterize a curvature of the lumber 118. In some examples, sensors 124 can be placed along the cutting table 104 and be spaced apart 138 to detect the position of the lumber 118 as the lumber 118 moves 122 along the cutting table 104. In some examples, the distance 138 between the sensors 124 can be in a range of approximately 100-900 mm. In one example, the distance 138 between the sensors 124 can be approximately 900 mm apart. Upon reaching a cutting position on the cutting table 104, the lumber 118 can be secured and/or clamped against a wall of the automated cutting system 100 in preparation for cutting 126. In some embodiments, the sensor module 108 can be used to and/or configured to measure the movement of the lumber 118 along the cutting table 104. In some examples, the velocity of the lumber 118 can be determined using the sensors 124 and the sensor module 108. The velocity of the lumber 118, e.g., as it moves 122 down a cutting table 104 (e.g., prior to, during and/or subsequent to a cutting process 126), can be determined by the timing between detecting the lumber 118 as the lumber 118 passes each of the sensors 124. The sensors 124 can be calibrated to the velocity of the lumber 118 and/or to the rollers of the actuating module 106, e.g., to account for changing roller diameters for a particular measuring mechanism and/or measuring roller. In some examples, the distance 138 between the sensors 124 can be used by the sensor module 108 to determine the number of rotations the rollers of the actuating module 106 have made, and based on the determination, provide a ratio between the distanced traveled to the rotations of the rollers. In one example, the number of encoder rotations can be used to calculate a roller diameter using the distance 138 between the sensors 124. The cutting module 112 can be used to cut the lumber to a particular shape and/or size, forming cut lumber 120. The cutting module 112 can include a saw, circular saw, robot cutter, among other cutting equipment. The actuating module 106 can move and position the cut lumber 120 to be received by the unloading module 132. The unloading module 132 can unload 130 the lumber to an unloading area 136, e.g., such as a rack.

In some embodiments, prior to cutting the lumber 118, the labeling module 114 can add a label to the lumber 118. Subsequent to cutting the lumber 118, the labeling module 114 can add a label to the cut lumber 120. The label can include information about the lumber 118 and/or cut lumber 120 including, but not limited to, a size, shape, curvature, type of wood, date of cut, machine used for cutting, among other information. The label can include a bar code and/or a 2D bar code, among others. The labeling module 114 can include labeling labelling equipment 144. The labelling equipment 144 can include a label applicator, a sticker applicator, among other labeling equipment.

In some embodiments, the sawdust collecting module 116 can collect sawdust from the cutting table 104. In some examples, the sawdust collecting module 116 can collect sawdust from the cutting table 104 subsequent to a cutting process. The sawdust collecting module 116 can include sawdust collecting equipment 146. The sawdust collecting module 116 can include a vacuum, a blower, a collection bag, a collection tray, among other equipment.

Referring again to FIG. 1A, the automated cutting system 100 can receive the lumber 118 from the loading area 134, inspect and precisely position the lumber 118 on the cutting table 104 in preparation for cutting 126, cut 126 the lumber, and output cut lumber 120 to an unloading area 136. In some examples, the cut lumber 120 can be used to assemble lumber-based construction components, e.g., such as for a wall frame, among others. The automated cutting system 100 can cut lumber 118 to a target size to form cut lumber 120 that can be used in residential, commercial, and/or industrial construction applications.

Referring to FIG. 1A, in some embodiments, the loading module 102, actuating module 106, cutting module 112, and/or the unloading module 132 of the automated cutting system 100 can include companion end effectors, among other automation components. The companion end effectors can be used for loading 128, unloading 130, and cutting 126 the lumber 118. The loading module 102, actuating module 106, cutting module 112, and/or the unloading module 132 can include the multi-axis robot, among other automation equipment. In some examples, the automation equipment can be from Fanuc and/or ABB robotics company. In one example, the loading module 102, actuating module 106, cutting module 112, and/or the unloading module 132 can include a 7 axis robot. The automated cutting system 100 can be used to and/or configured to inspect and/or verify a length of lumber 118 before cutting, and to inspect and/or verify a length of cut lumber 120 after cutting 126. The automated cutting system 100, e.g., via the computing module 110, can determine a target size of the cut lumber 120 based on the size of the received lumber 118. The automated cutting system 100 can generate lumber information based on an inspection of the received lumber 118. In some examples, the computing module 110 can analyze lumber information received from the actuating module 106 and sensor module 108. In some examples, the computing module 110 can generate the lumber information based on the inspection performed by the loading module 102, actuating module 106, and/or the sensor module 108. The loading module 102, actuating module 106, and/or the sensor module 108 can inspect the lumber to verify a size (e.g., length, width, height, shape) of lumber prior to cutting. In some examples, the automated cutting system 100 can determine the size of the lumber 118 prior to entering a cutting area of the automated cutting system to determine where particular cuts on the lumber 118 should be performed. The automated cutting system 100 can be configured to collect sawdust, and/or any type of byproduct generated subsequent to the cutting and/or processing of lumber. In some examples, the actuating module 106 and/or the cutting module 112 can be used to collect the sawdust from the cutting table 104. The automated cutting system 100 can be used to and/or configured to boost efficiency of lumber processing, and automate wood panel production by reducing human intervention, and/or reducing external input generally performed in conventional wood panel production. In some examples, the actuating module 106 can include motors, among other automation instruments and equipment. The loading module 102, unloading module 132, and actuating module 106 can include automation equipment 140. The automation equipment 140 can include conveyors, rollers, motors, and robot arms, among other automation systems.

Referring again to FIG. 1A, in some embodiments, the automated cutting system 100 can be used to and/or be configured to receive, measure, cut, and/or process lumber, and/or any type of wood which can be used for residential, commercial and/or industrial construction applications. In some examples, the automated cutting system 100 can be used to and/or is configured to receive lumber having a length of approximately between 8-16 feet, a height of approximately 1.5 inches, and/or a width of approximately 3.5 inches, from a loading area 134 such as pallet. The automated cutting system 100 can be used to and/or is configured to output a 2 inch×4 inch wood planks having a length approximately between 8-16 feet. The automated cutting system 100 can be used to and/or is configured to cut sides of the lumber 118. The automated cutting system 100 can be used to and/or is configured to perform one or more cuts per side of the lumber 118. In one example, the automated cutting system 100 can be used to and/or is configured to perform approximately 2 cuts per side of lumber 118 having dimensions of approximately 2 inch×4 inches and/or 2 inch×6 inches. The automated cutting system 100 can be used to and/or is configured to collect, remove and/or dispose sawdust produced during cutting 126. The automated cutting system 100 can be configured to collect and/or clean subsequent to cutting 126, e.g., the system 100 can collect and/or clean sawdust from the automated cutting system 100. The automated cutting system 100 can be used to and/or is configured to manage sawdust during cutting 126 and/or processing and minimize cleanup from sawdust during and/or after cutting 126 and/or processing of the lumber 118. The automated cutting system 100 can be used to and/or is configured to remove scrap, excess wood materials, and/or byproduct from the cutting 126 and/or processing performed. In some embodiments, the automated cutting system 100 can perform maintenance, to remove excess wood materials, scrap, and/or byproduct from the automated cutting system 100. The maintenance can include self-maintenance, e.g., maintenance performed independently the automated cutting system 100 alone, and/or guided maintenance, e.g., maintenance procedures guided by an operator. In some examples, the sawdust collecting module 116 can remove scrap, excess wood materials, remove sawdust, and/or byproduct from the cutting 126. The cutting 126 and/or processing of the lumber 118 can be partially and/or fully automated. The automated cutting system 100 can have a consistent, and/or repeatable cutting tolerance of at most approximately $\frac{1}{32}$ inches. The automated cutting system 100 can output the cut lumber 120 having dimensions of approximately 7 inches to 16 ft long. The automated cutting system 100 can be used to and/or configured to perform angled cuts and/or cuts performed in polygonal patterns. The automated cutting system 100 can be used to and/or is configured to perform cuts at an angle of approximately ±75° on the wide face and/or approximately ±65° on the short face of the lumber 118. The automated cutting system 100 can be configured to perform orthogonal cuts on the lumber 118, e.g., the lumber 118 having dimensions of approximately 2 inches×6 inches.

Referring again to FIG. 1A, in some embodiments, the cutting module 112 of the automated cutting system 100 can include one or more cutting equipment 142. In some examples, the cutting equipment 142 is separate from the cutting module 112, e.g., the cutting module can include software and/or hardware components that can control a blade, saw, among other cutting equipment 142. In some examples, such a cutting equipment 142 can include a circular saw, among other cutting equipment 142. The cutting module 112 can be used to perform precision cutting 126 of the lumber 118. In some examples, the cutting module 112 can be used to control a relative cutting direction of the circular saw. For example, the relative direction of the cut of the circular saw can affect a preferred finish of the resulting cut lumber 120. The cutting module 112 cane be used to and/or is configured to control a cutting speed and/or feed rate for a precise and/or clean finish of the resulting cut lumber 120. The cutting module 112 can be used to and/or is configured to perform cuts through paths, e.g., which can be referred to herein as cutting tool paths. The cutting paths can include one or more of the same cutting tool paths and/or different cutting tool paths.

Referring again to FIG. 1A, in some embodiments, the sensors 124 of the sensor module 108 can include encoders, linear encoders, rotary encoders, optical sensors, photoelectric sensors, among others. The encoders can be configured to have a resultant precision of approximately at least $\frac{1}{32}$ of an inch. The encoders can include a motorized end-stop. The encoders and optical sensors can be used together to determine when lumber reaches a specific location along the cutting table 104. In some embodiments, the actuating module 106, and/or the cutting table 104, together with the sensor module 108 can be used together to determine when lumber reaches a specific location along the cutting table 104. In some examples, the actuating module 106 can be used to move 122 the lumber 118 into a cutting area of the cutting table 104, and a rotary encoder of the sensor module 108 can be used to determine how far the lumber 118 has traveled along the cutting table 104 based on a known geometry and/or length of the table. In some examples, independent rotary encoders of the sensor module 108 can be connected to free rollers of the cutting table 104 to verify a translation distance of the lumber 118.

Referring again to FIG. 1A, in some embodiments, the loading module 102, unloading module 132, and/or the actuating module 106 can be used to can pick, place, and/or manipulate, lumber 118. The actuating module 106 can be used to cut lumber 118. The loading module 102 can be used to pick-up lumber from loading area 134 such as a pallet, and/or place it in tall orientation on the cutting table 104. Rollers of the actuating module 106 can make contact with the lumber 118, in an example, to guide the lumber 118 along the cutting table 104. One or more of the motorized rollers of the actuating module 106 can propel the lumber 118 until it crosses one or more sensors 124 which can be used to tare a position of the lumber 118 on the cutting table 104. In some examples, the sensors 124 can be used to set a zero position of the lumber 118 on the cutting 126. A roller of the actuating module 106, e.g., a motorized roller, can be used to move the lumber 118 to a specific location on the cutting table 104 prior to being clamped onto the cutting table 104 in preparation for the cutting 126 process. The robot arm of the actuating module 106 can subsequently use a cutting end effector to make cuts on the lumber 118. Subsequent to cutting one side of the lumber 118, the rollers can move the lumber 118 into a position on the cutting table 104 for the automated cutting system 100 to repeat the cutting process on another end of the lumber 118, e.g., a second end of the lumber 118. Once cutting and/or processing by the automated cutting system 100 has completed, the rollers can move the resulting cut lumber 120 into another position where the unloading module 132 can move and/or pick up the lumber 118 for placement onto unloading area 136. Subsequently, the cut lumber 120 can be ready for immediate use and/or storage. In some examples, and as described herein, the cut lumber 120 can include 2 inch×4 inch lumber. In some examples, the automated cutting system 100 can include a hard stop. The automated cutting system 100 the actuating module 106 can be used to position of the lumber 118 where it can be tared, and that the motion of the lumber 118 on a cutting table 104 can be controlled using a variable hard stop. The hard stop can be used and/or is configured to be driven by a rack and pinion system of the actuating module 106. The automated cutting system 100 can use a linear encoder with a resolution enough to determine a location for the hard stop. The hard stop can be used to push the lumber 118 in a single direction along the cutting table 104. Pushing the lumber 118 in this way can allow for teeth of a circular saw of the cutting module 112 to mesh against one side of the lumber 118. Prior to each cut, the lumber 118 can be positioned at zero position using a known position of the hard stop. The automated cutting system 100 can include multiple sub-assemblies. Using multiple sub-assemblies, lumber 118 can be unloaded from a pallet to a conveying system that can take the stock material and prepare each piece for cutting by aligning it by a preferred orientation. The lumber 118 can then be fed into the cutting area of the cutting table 104 where a saw can be used that include an approximately up to 6 degrees of freedom depending on the orientation of lumber 118 during cutting. The cutting 126 can be performed by a robotic arm of the actuating module 106. A blade of the cutting module 112 can move similar to a CNC machine, e.g., the blade can make use of the rigidity of the cutting table 104 as it cuts.

Figure 1B:
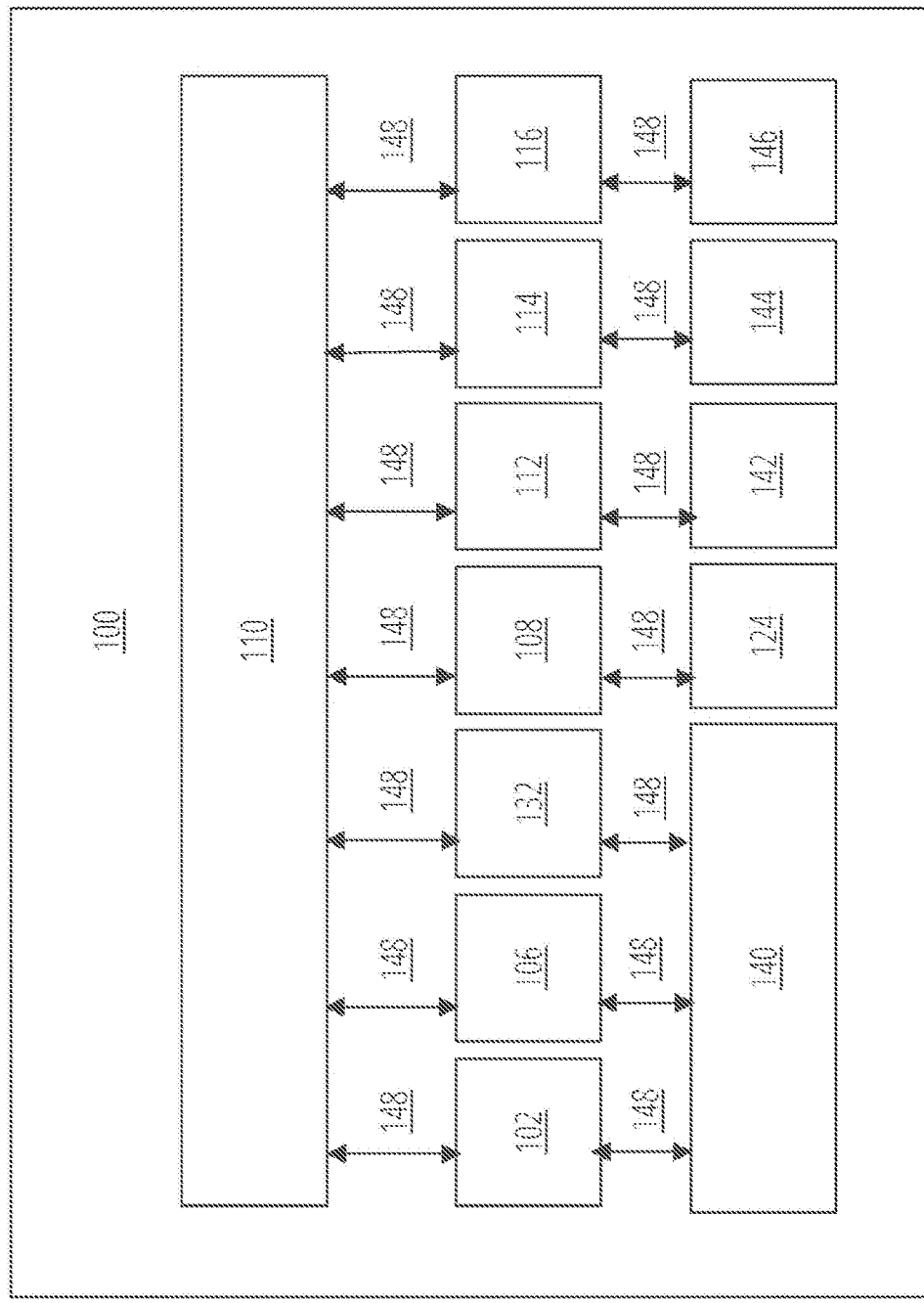
FIG. 1B illustrates a block diagram of the automated cutting system, according to some embodiments.

Referring to FIG. 1B, a block diagram for the automated cutting system 100 is shown, according to some embodiments. In some embodiments, the automated cutting system 100 can include a loading module 102, an actuating module 106, a sensor module 108, a computing module 110, a cutting module 112, a labeling module 114, a sawdust collecting module 116, an unloading module 132, among other modules and/or systems. The computing module 110 can be used to control and/or communicate 148 with each of the other modules 102, 106, 108, 112, 114, 116, 132. Each of the modules 102, 106, 108, 112, 114, 116, 132 can be connected to the computing module 110. In some examples, the modules 110, 102, 106, 108, 112, 114, 116, 132 can be connected via a wired and/or a wireless communication. In some examples, the modules 110, 102, 106, 108, 112, 114, 116, 132 can be connected via local area network (LAN). The modules can be connected via Bluetooth, WIFI, ZigBee, among other wireless communication. The loading module 102, unloading module 132, and actuating module 106 can control and/or communicate 148 with automation equipment 140. The automation equipment 140 can include conveyors, rollers, motors, and robot arms, among other automation systems. Each of the modules 102, 106, 132 have corresponding automation systems. In some examples, the loading module 102 can be used to control and/or communicate 148 with a robot arm for picking-up lumber for processing. The unloading module 132 can be used to control and/or communicate 148 with a robot arm for placing cut lumber 120 into an unloading area 136 for subsequent processing. In some embodiments, the loading module 102 and the unloading module 132 are the same module, e.g., a single module is used for loading and unloading. The actuating module 106 can be used to control and/or communicate 148 with a roller for moving lumber along a cutting table 104 of the automated cutting system 100. The sensor module 108 can be used to control and/or communicate 148 with sensors 124 such as optical detectors, among other sensors and/or detectors. The cutting module 112 can be used to control and/or communicate 148 with cutting equipment 142 such as a circular saw, among other equipment. The labeling module 114 can be used to control and/or communicate 148 with labelling equipment 144 such as a label applicator, a sticker applicator, among other labeling equipment. The sawdust collecting module 116 can be used to control and/or communicate 148 with sawdust collecting equipment 146 such as a vacuum, a blower, a collection bag, a collection tray, among other equipment. Each of the modules 102, 106, 108, 112, 114, 116, 132, can include a computing system. In some embodiments, the modules 102, 106, 108, 112, 114, 116, 132 can be remotely accessed over the internet.

In some embodiments, the automated cutting system 100 can be used to and/or is configured to perform one or more types of cutting techniques on the lumber 118. In the automated cutting system 100 can perform a plunge cut, a swipe cut, and/or any other type of cutting techniques. The plunge cut can include a cut which can enter the lumber 118 orthogonally. In some examples, the plunge cut can be perpendicular to a long side of the lumber 118. The plunge cut can travel in and out of the lumber 118. The swipe cut can include a cut that is parallel to the long side of the lumber 118. Performing the swipe cut can include the automated cutting system 100 orienting a blade (e.g., a circular saw) above and/or below the lumber 118 before traveling across a face of the lumber 118.

As described above, in some embodiments, the automated cutting system 100 can include multiple sub-assemblies and/or components. Each of the components can be used to perform a step in a cutting process. In some examples, the loading module 102 can load the lumber 118 from a loading area 134 such as a pallet to a conveying system of the actuating module 106. The conveyor can prepare the lumber 118 for cutting by aligning the lumber 118 into a preferred orientation. The lumber 118 can be subsequently guided and/or moved to the cutting table 104 by the conveyor, where a saw of the cutting module 112 can cut the lumber 118 to size to form cut lumber 120. The automated cutting system 100 can use a robot arm for manipulation and/or cutting. The automated cutting system 100 can include a hard stop. The automated cutting system 100 can control, measure and tare a position of the lumber 118 using the sensor module 108. The motion of the lumber 118 on a cutting table 104 can be controlled using a variable hard stop. The hard stop can be configured to be driven by a rack and pinion system of the actuating module 106. In some examples, the actuating module 106 and/or the cutting module 112 can be configured to mitigate backlash of the rack and pinion system, e.g., using a linear encoder with high resolution to determine the location of the hard stop. The hard stop can be used to push the lumber in a single direction. Pushing the lumber 118 in this way can allow for teeth of a circular saw of the cutting module 112 to mesh against one side of the lumber 118. Prior to each cut, the lumber 118 can be positioned at zero position using a known position of the hard stop. The saw can have approximately up to 6 degrees of freedom depending on the orientation of lumber 118 during cutting. In one example, a cutting table 104 can include a blade that makes use of a rigidity of the cutting table 104 during the cutting process. Subsequently, the unloading module 132 can unload the cut lumber 120 to an unloading area 136.

Figure 2:
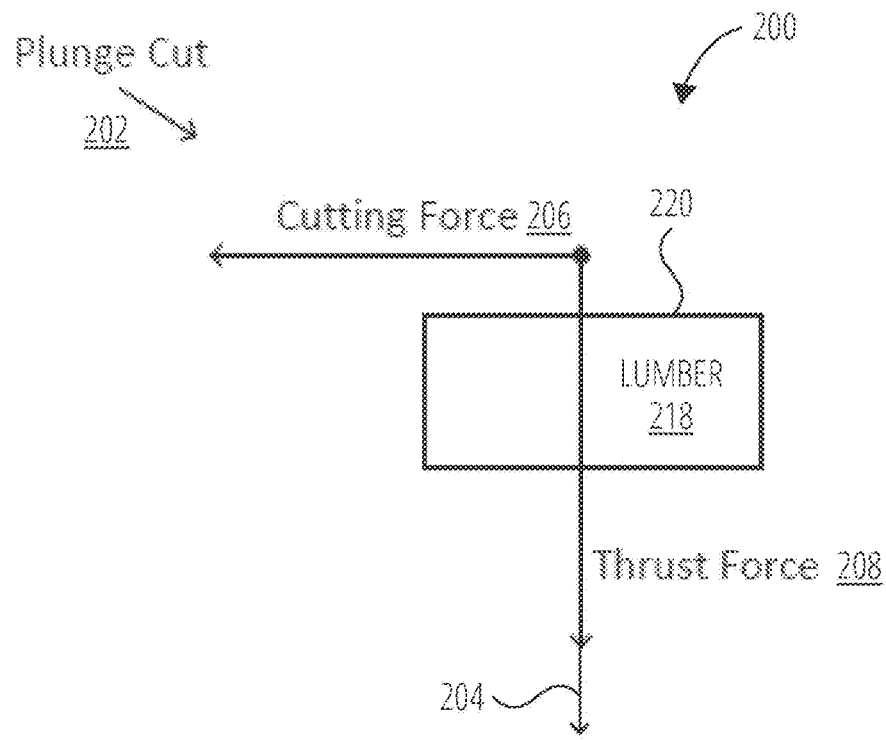
FIG. 2 illustrates wood cutting diagrams, according to some embodiments.
Figure 2:
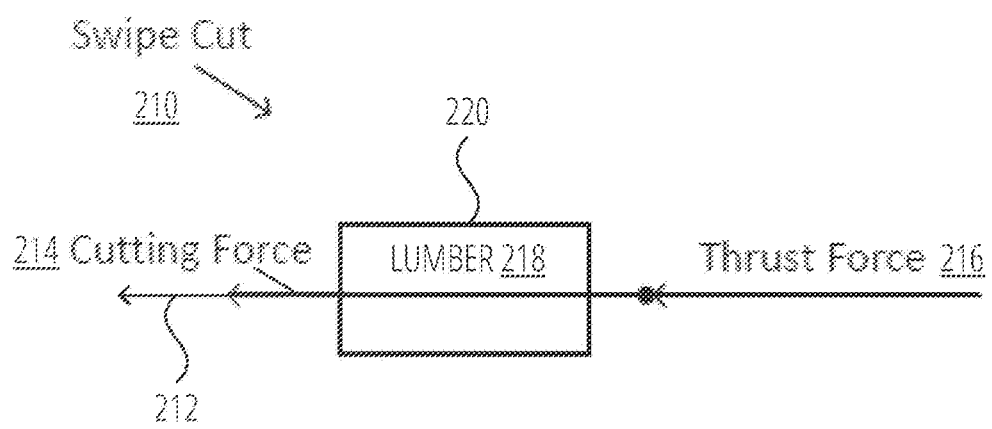

Referring to FIG. 2, wood cutting diagrams 200 are shown, according to some embodiments. In some embodiments, the wood cutting diagrams 200 include a plunge cut 202 and a swipe cut 210. The automated cutting systems described herein can perform at least one of the cutting methods depicted by the wood cutting diagrams 200 shown in FIG. 2. In some examples, the automated cutting systems can be used to and/or are configured to perform the plunge cut 202, the swipe cut 210, and/or any other type of cutting methods. The plunge cut 202 can include a cut which can enter the lumber 218 orthogonally 204, e.g., a plunge cut direction 204 is perpendicular to a long side 220 of the lumber 218. The plunge cut 202 can travel in and out of the lumber 218. The swipe cut 210 can include a cut that is parallel 212 to the long side of the lumber 218. In some examples, a swipe cut direction 212 is parallel to the long side 220 of the 218. The swipe cut 210 can orient a blade (e.g., a circular saw) of an automated cutting system above and/or below the lumber 218 before traveling across a face of the lumber 218. In some embodiments, one or more variables used in calculating for a precise and/or controlled cut 202, 210 can be accounted for based on equations used to derive forces from cutting the lumber 218. The variables can include a rake force, shear force, thrust force, and/or frictional angles, speed of cutting and/or a diameter of the blade used for cutting. One or more presented calculations and/or formulas can be developed and/or based on a single-tooth, metal cutting mechanism. The plunge cut 202 and swipe cut 210 can collectively be referred to as reaction forces 202, 210. The reaction forces 202, 210 from cutting the lumber 218 can be separated into their corresponding force vectors. In some examples, reaction forces 202, 210 can be separated into two force vectors: cutting force 206, 214 and a thrusts force 208, 216, e.g., corresponding for each of the plunge cut 202 and the swipe cut 210. In some examples, the plunge cut cutting force 206 can include a force tangent to a cutting blade's tooth travel path. The plunge cut thrust force 208 can include a force that is in the plunge cut direction 204. The swipe cut cutting force 214 can include a force tangent to a cutting blade's tooth travel path. The plunge cut thrust force 208 and the swipe cut thrust force 216 can both be in the same direction as the swipe cut direction 212. Each of the force vectors can be calculated using known variables. Each of the force vectors can be tested to validate the accuracy of the automated cutting system 100, e.g., in comparison to calculated, and/or simulated target values of the corresponding force vectors. In some examples, prior to or subsequent to cutting the lumber 218, the automated cutting system 100 can add a label to the cut lumber. The label can include information about the cut lumber, e.g., the size, shape, type of wood, date of cut, machine used for cutting, among other information. The label can include a bar code and/or a 2D bar code, among others.

Figure 3A:
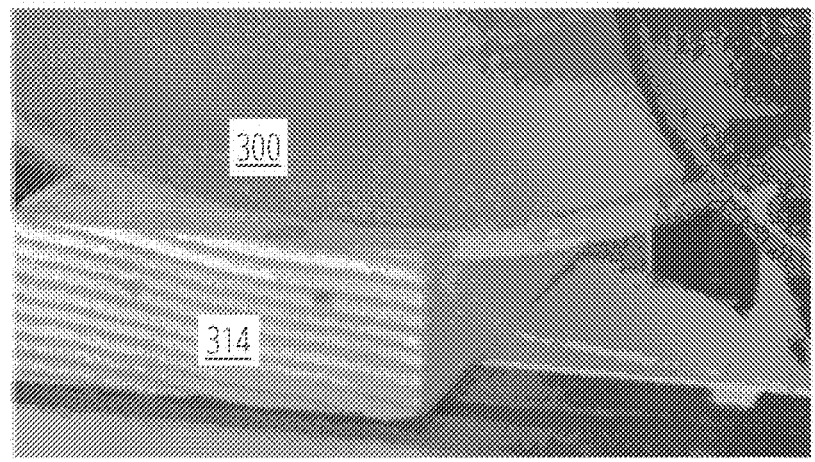
FIG. 3A illustrates an exemplary cutting tool cutting a piece of lumber, according to some embodiments.

Referring to FIG. 3A, an exemplary cutting tool 300 cutting a piece of lumber 314 is shown, according to some embodiments. In some embodiments, the cutting tool 300 is a circular saw. In some examples, a first test was performed to determine a cutting force of a miter saw using a high speed camera. The same test was performed to determine the resultant revolutions per minute (RPM) of the blade (e.g., circular blade) during cutting.

Figure 3B:
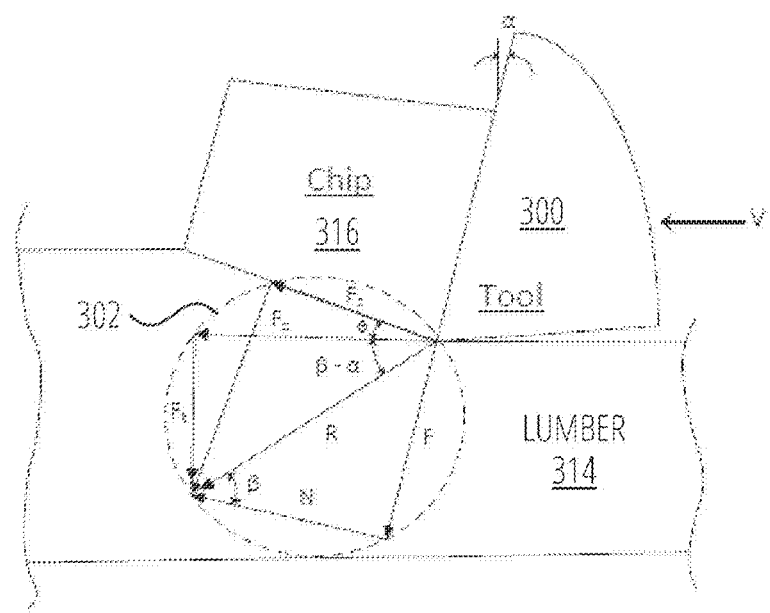
FIG. 3B illustrates an exemplary force diagram for a cutting tool, according to some embodiments.

Referring to FIG. 3B, an exemplary force diagram 302 for a cutting tool 300 is shown, according to some embodiments. In some embodiments, while cutting a 2 inch×4 inch lumber 314, a resultant cutting force can be determined provided a known power output and the frames between revolutions of the blade can be captured, e.g., using kinetics. In one example, a resultant force was calculated be approximately 28.19 Newtons.

Figure 4A:
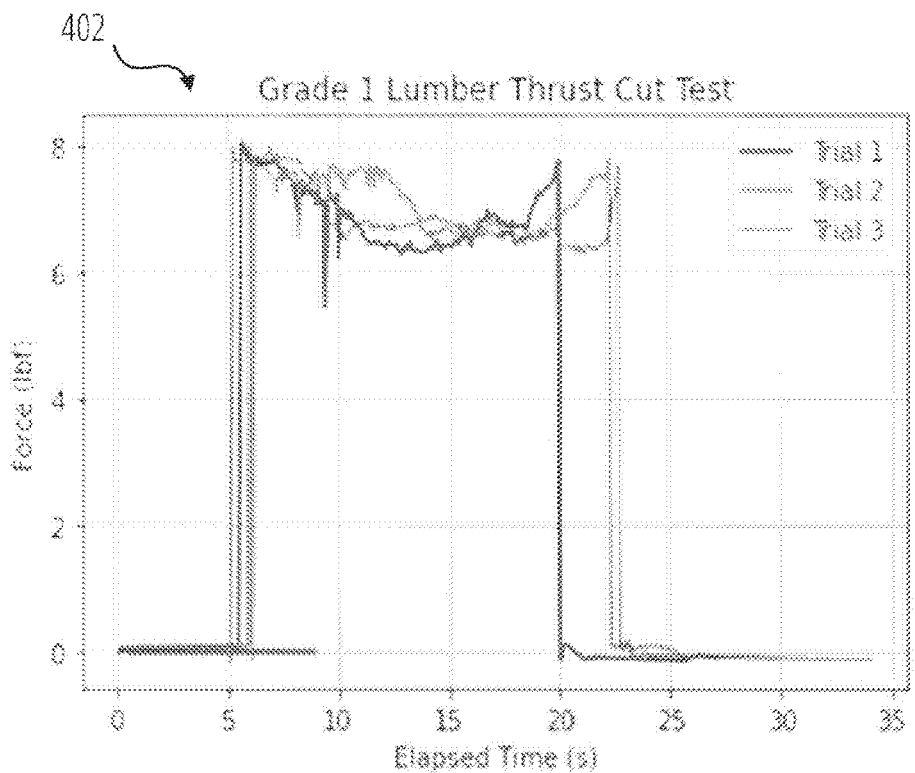
FIG. 4A illustrates exemplary graphical force vs. time measurements for lumber, according to some embodiments.
Figure 4B:
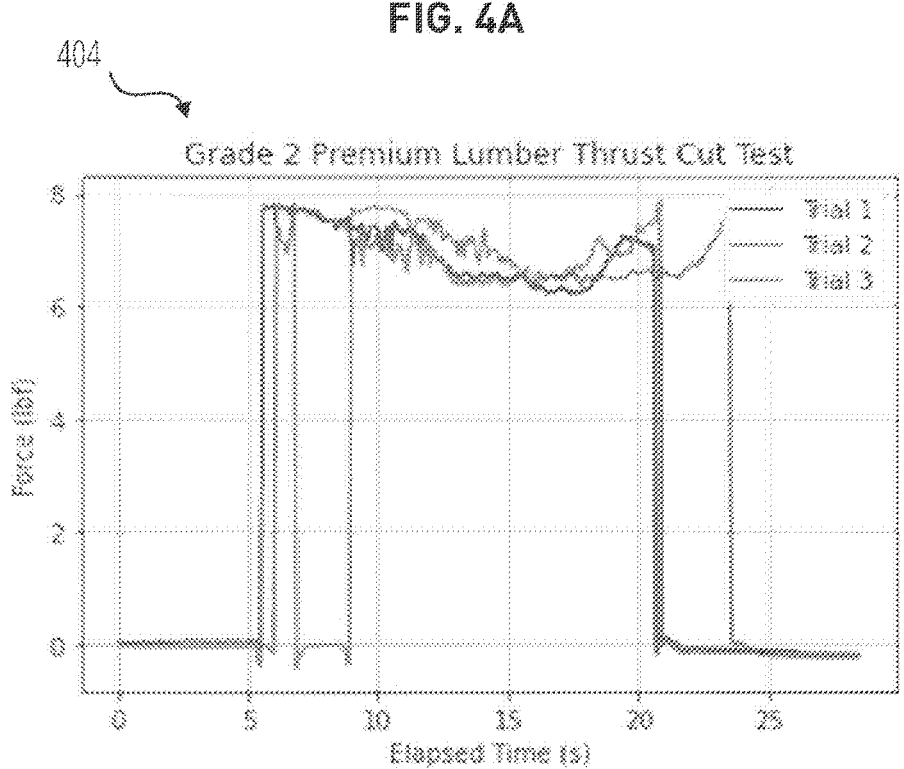
FIG. 4B illustrates exemplary graphical force vs. time measurements for lumber, according to some embodiments.

Referring to FIG. 4A and FIG. 4B, exemplary graphical force vs. time measurements 402, 404 for lumber are shown, according to some embodiments. FIG. 4A shows a graphical force vs. time measurements for a thrust test 402. FIG. 4B shows an exemplary graphical force vs time measurement for a premium lumber thrust test 404. A calculated cutting force, in one example of approximately 22.61 N and a calculated thrust force, in one example of approximately 19.95 N, were both lower when compared actual measurements. In some examples, differences in lumber material and/or additional cutting teeth on the saw blade can potentially cause the observed differences.

Figure 5:
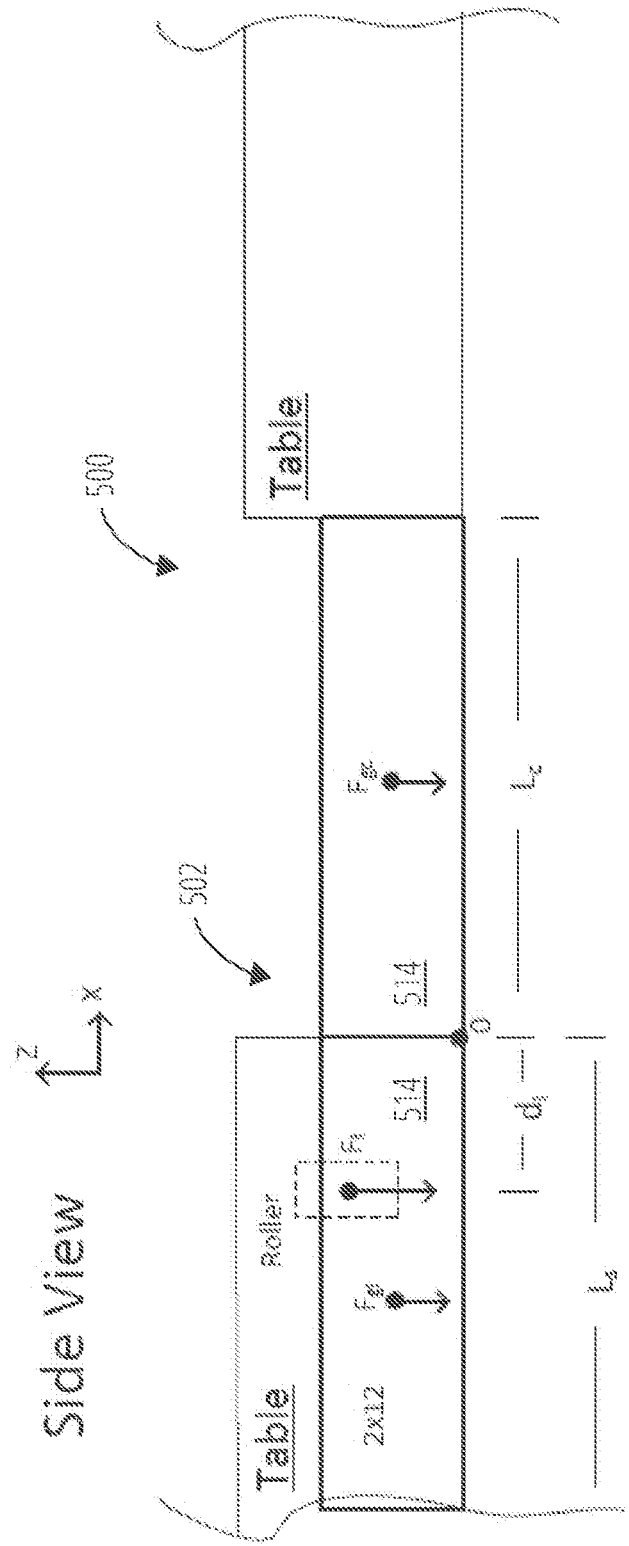
FIG. 5 illustrates a force diagram for an automated cutting system, according to some embodiments.

Referring to FIG. 5, a force diagram 302 for an automated cutting system 500 is shown, according to some embodiments. In some embodiments the force diagram 302 shows a length of a cutting area 508, a cutting table 506, a length of remaining stock 510, a distance between roller and cutting area 512, a force due to weight of wood board over cutting area 516, a force due to weight of wood board over table 518, a friction force of a roller 520, and a roller 504. In some examples, an arbitrary value (e.g., approximately 20 inches) can be provided for a length of remaining stock 510 $L_c$, based on a form factor of one or more circular saws. The form factor of circular saws can include a space optimal for a cutting end effector. In some embodiments, a remaining stock length on the cutting table 506 can be approximately 1.5 times the length of the cutting area to allow that the lumber 514, wood board and/or wood plank does not pivot about point 0. In one example, this configuration can allow that the friction force of a roller 520 $F_f$ of a drive roller 504 to be negligible at the moment about 0.

Figure 6:
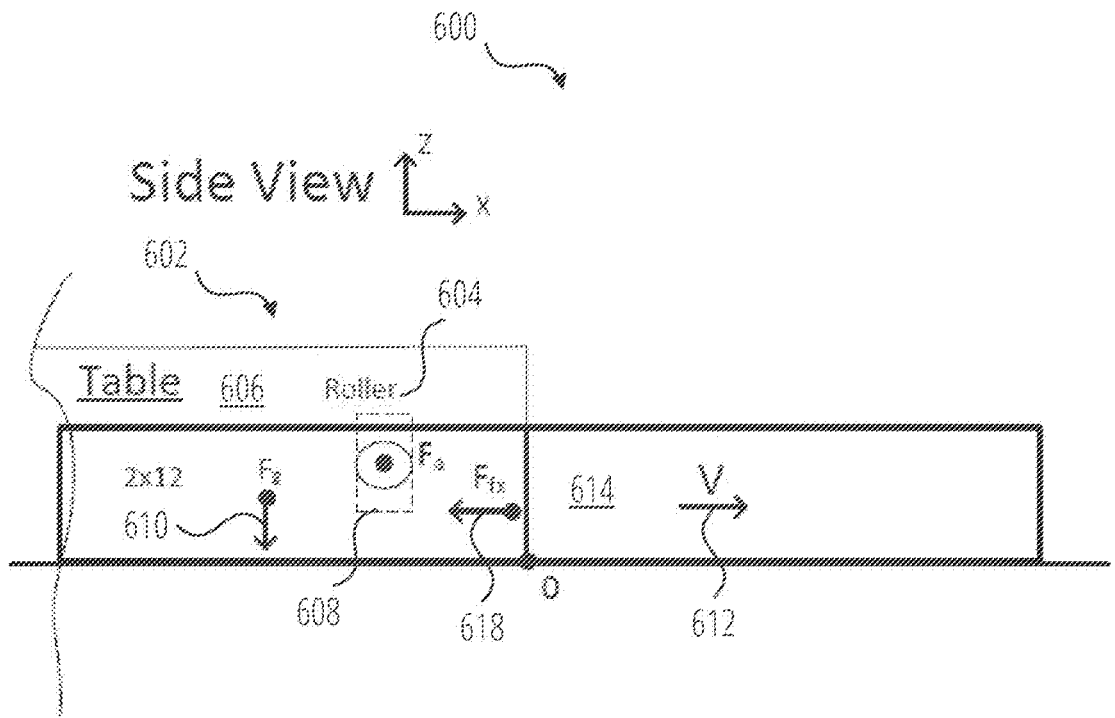
FIG. 6 illustrates a force diagram for an automated cutting system, according to some embodiments.

Referring to FIG. 6, a force diagram 602 for an automated cutting system 600 is shown, according to some embodiments. In some embodiments, the force diagram 602 shows a roller 604, cutting table 606, a piston, an applied force to the piston 608, a force due to weight of the wood 610, speed of the wood translating into the x-axis 612, lumber 614, a radius of the driver roller 616, friction force caused by the weight of the wood board and applied force by the piston 618, and a torque to overcome friction 620. In some examples, the force diagram 602 shows forces $F_g$ 608, $F_a$ 610 that can compound to the total frictional force Fix 608 a motor of the automated cutting system 600 can be configured to overcome during operation. A clamping force of a drive roller 604 used can be approximately in a range of 5-10 lbf. In some examples, the clamping force of the drive roller 604 used can be approximately in a range of 5-10 lbf to allow surface contact and/or to maintain traction. Varying the clamping force, e.g., to approximately 5 lbf, can increase the friction force by approximately 147.38 N, caused by the weight of a 16 ft 2 inch×12 inch lumber, e.g., providing for a force at approximately 245.63 N, to a total friction force of approximately 160.72 N. Provided this example and using a 3 inch diameter roller, a torque t 620 of approximately 6.12 Nm can be used to overcome frictional forces $F_{fx}$ 618.

Figure 7A:
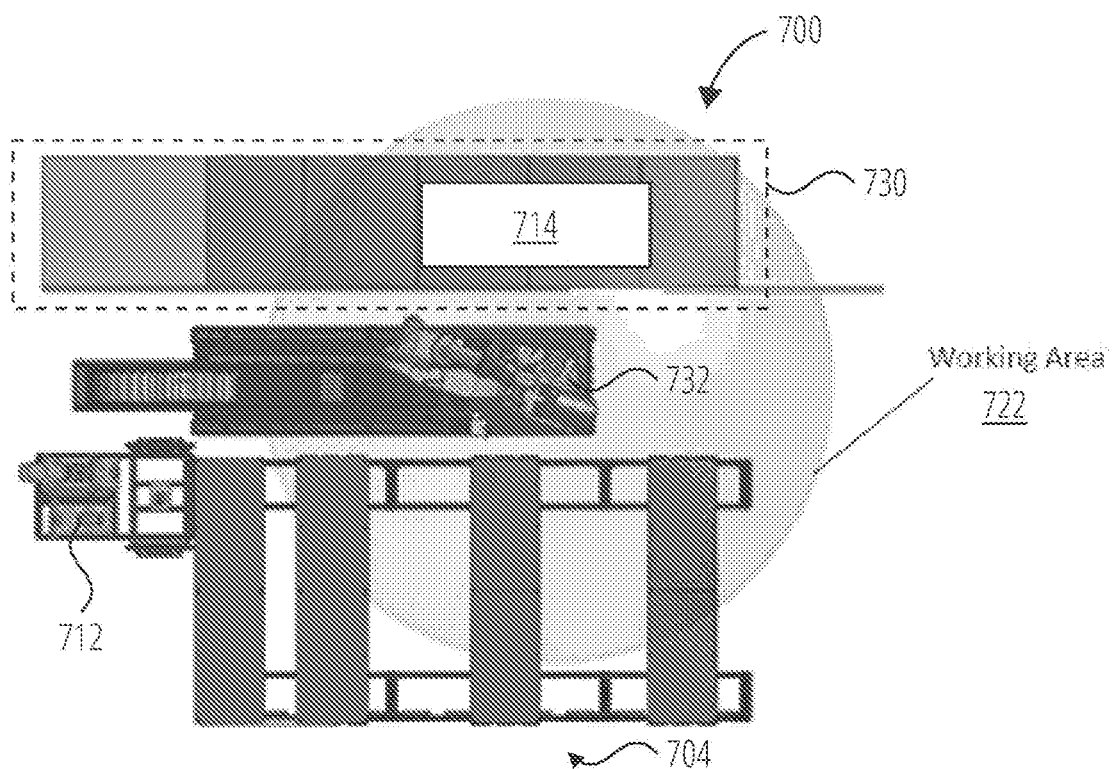
FIG. 7A illustrates an automated cutting system, according to some embodiments.
Figure 7B:
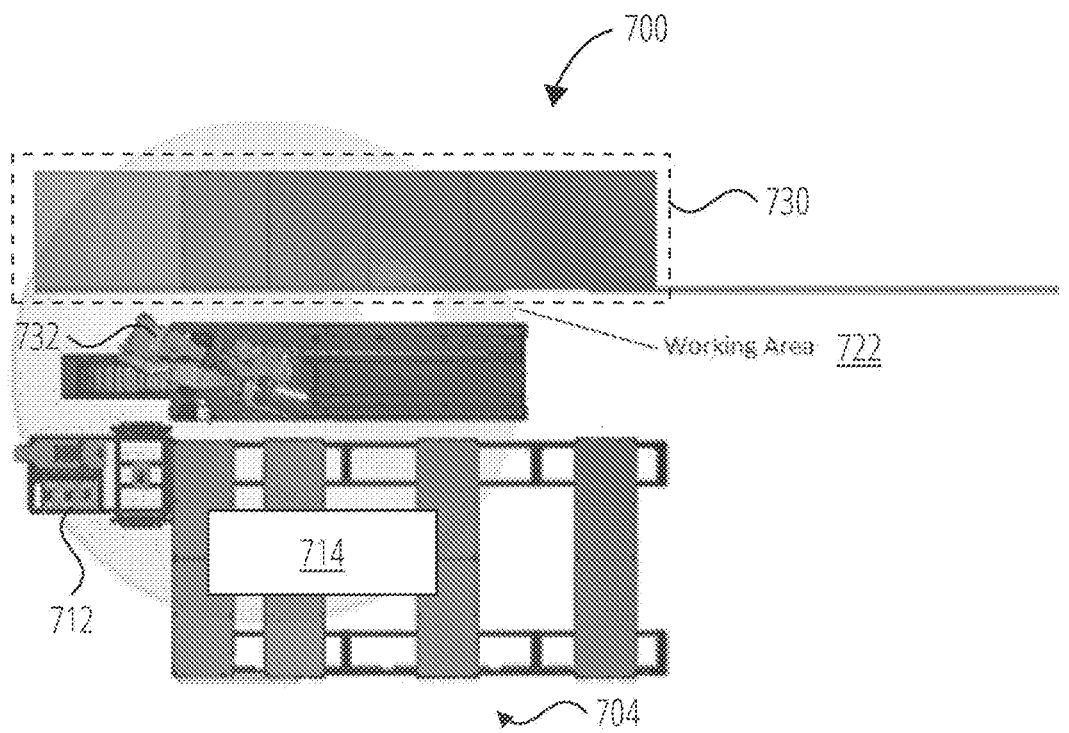
FIG. 7B illustrates the automated cutting system, according to some embodiments.
Figure 7C:
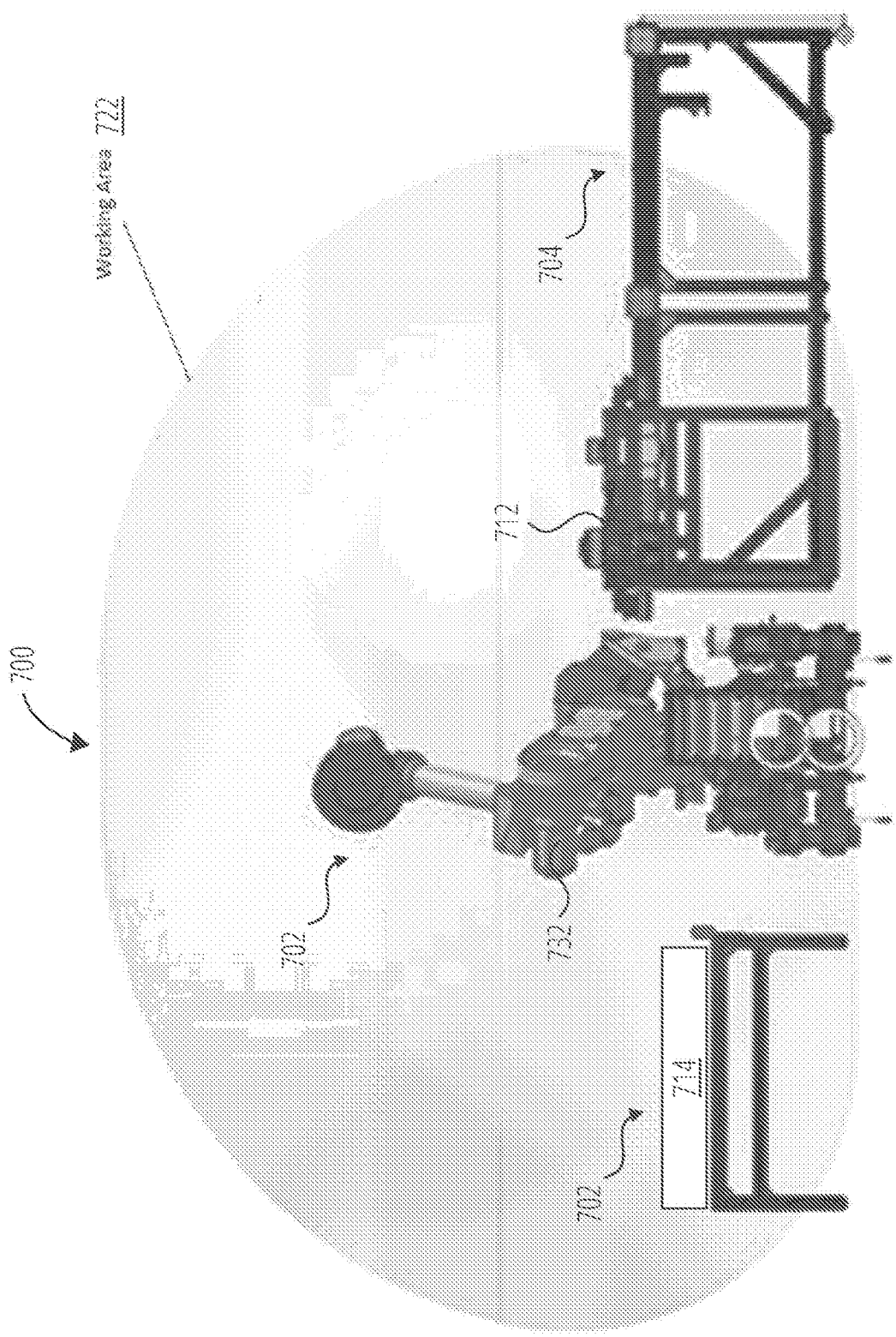
FIG. 7C illustrates the automated cutting system, according to some embodiments.

Referring to FIG. 7A, FIG. 7B and FIG. 7C, an automated cutting system 700 is shown, according to some embodiments. In some embodiments, the automated cutting system 700 includes a loading module 702, a cutting table 704, a loading area 730, among other components. lumber 714 can be placed onto the loading area 730 in preparation for a cutting operation. The loading module 702 can include a robot arm 732. The loading module 702 can use the robot arm 732 to move the lumber 714 from the loading area 730 to the cutting table 704. A cutting module 712 can be used to cut the lumber 714 upon receiving the lumber 714 from the loading area 730. The automated cutting system 700 can include a working area 722 surrounding the automated cutting system 700. The 700 can be a spherical and/or circular working area 722 surrounding the automated cutting system 700. The working area 722 can be located surrounding and/or around a robot arm 732 of the automated cutting system 700. As used herein, the working area 722 can be referred to as a workspace of the automated cutting system 700, among other terms. A predetermined working area 722 and/or workspace can be configured for sawdust management, automated cutting system size, and/or end effector geometry. In some examples, the working area 722 can include a diameter approximately 1-2 feet farther than the reach of robot arms 732 of the automated cutting system 700. The working area 722 can be calibrated to determine a size, and/or angle limits of the expected outputs for the automated cutting system. Software can be used to determine truss diagrams, angles and/or length of cuts to determine the angle range of an end-effector and/or size of the cutting area. The automated cutting system 700 can be used to and/or is configured to access end effectors, reach in and/or around a space where a stock material can be located, and/or reach a cutting area. The working area 722 can be configured to provide automated cutting system 700 at a back and/or front of a worktable where the end effectors can be located, e.g., located at areas accessible to robotic robot arms 732 of the automated cutting system 700.

Figure 8:
FIG. 8 illustrates table listing automated cutting systems, according to some embodiments.

Referring to FIG. 8, a table listing automated cutting systems 834 is shown, according to some embodiments. In some embodiments, table 834 lists a first automated cutting system 836, a second automated cutting system 838, and a third automated cutting system 840. The first automated cutting system 836 can include a robotic cutter, a roller and an automated table and/or conveyor. In some examples, the first automated cutting system 836 can include at least 5 unique components. A second automated cutting system 838 can include a robotic cutter, a rack and pinion, and an automated table and/or conveyor. The second automated cutting system 838 can include at least 6 unique components. A third automated cutting system 840 can include a machine automated unloading, aligning and cutting system. The third automated cutting system 840 can include at least 10 unique components. Although three exemplary embodiments of the automated cutting system are presented, one, two, three or more automated cutting systems embodiments can be used. Therefore, there can be one or multiple embodiments for the automated cutting system, and descriptions herein can apply equally to each embodiment.

Method for Automatically Cutting Lumber

Figure 9:
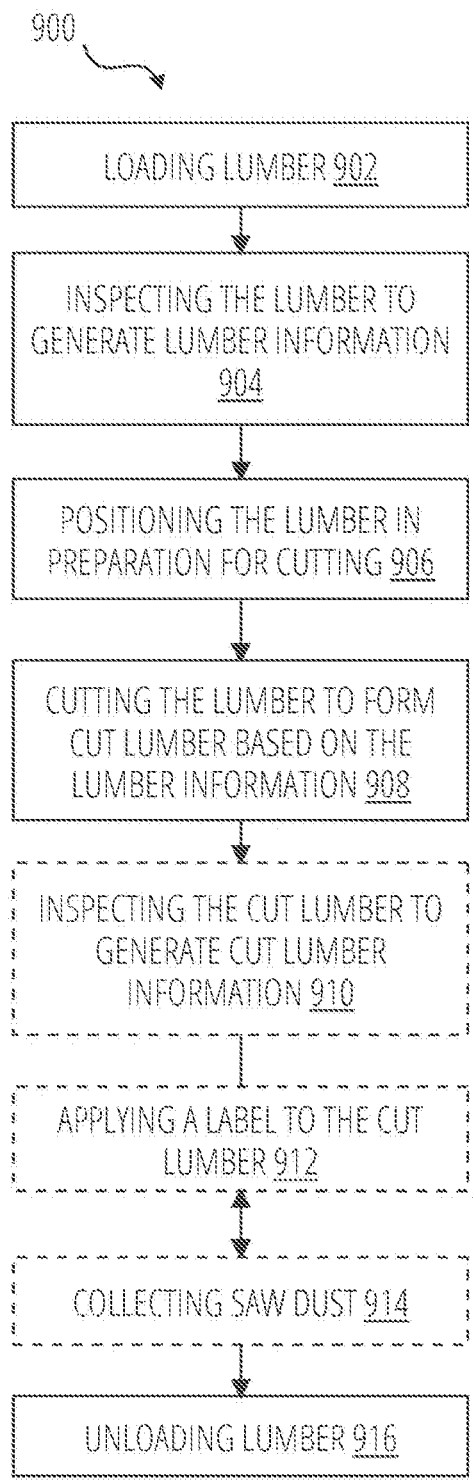
FIG. 9 illustrates a flowchart depicting a method for automatically cutting lumber, according to some embodiments.

Referring to FIG. 9, a method for automatically cutting lumber 900 is shown, according to some embodiments. At step 902, the method can include loading lumber 902. In some examples, step 902 can include receiving lumber from a loading area. In some examples, step 902 can include receiving lumber having a length of approximately between 8-16 feet, a height of approximately 1.5 inches, and/or a width of approximately 3.5 inches, from a loading area such as pallet. At step 904, the method can include inspecting the lumber to generate lumber information 904. In some examples, step 904 can include inspecting and/or analyzing a label on the lumber. Step 904 can include generating lumber information based on the label of the lumber. The label can be associated with lumber information corresponding to the lumber. The label can include a bar code and/or a 2D bar code, among others. In some examples, the lumber information can include a size, shape, type of wood, date of receipt, among other information. Step 904 can include verifying a length of the lumber with respect to stored lumber information before cutting. Step 904 can include characterizing a curvature of the lumber. At step 906, the method can include positioning the lumber in preparation for cutting 906. In some examples, step 906 can include positioning the lumber on a cutting table in preparation for cutting the lumber. At step 908, the method can include cutting the lumber to form cut lumber based on the lumber information 908. Step 908 can include cutting lumber to a target size to form cut lumber that can be used in residential, commercial, and/or industrial construction applications. Step 908 can include cutting sides of the lumber. Step 908 can include performing one or more cuts per side of the lumber. In one example, Step 908 can include to performing approximately 2 cuts per side of lumber having dimensions of approximately 2 inch×4 inches and/or 2 inch×6 inches. Step 908 can include managing sawdust during cutting to minimize cleanup of sawdust during after cutting. Step 908 can be performed and/or configured to be consistent, and/or repeatable. Step 908 can include performing cutting having a variable cutting tolerance of at least approximately $\frac{1}{32}$ inches. Step 908 can include cutting lumber to form cut lumber having dimensions of approximately 7 inches to 16 ft long. Step 908 can include performing angled cuts and/or cuts performed in polygonal patterns. Step 908 can include performing cuts at an angle of approximately ±75° on the wide face and/or approximately ±65° on the short face of the lumber. Step 908 can include performing orthogonal cuts on the lumber, e.g., the received lumber having dimensions of approximately 2 inches×6 inches. At an optional step 910, the method can include inspecting the cut lumber to generate cut lumber information 910. Step 910 can include determining and/or verifying a length of the cut lumber subsequent to the cutting step of 908. In an optional step 912, the method 900 can include applying a label to the cut lumber 912. In some examples, step 912 can include applying a label to the cut lumber subsequent to cutting. The label can include information associated the cut lumber, e.g., a size, shape, type of wood, date of cut, machine used for cutting, among other information. The label can include a bar code and/or a 2D bar code, among others. At an optional step 914, the method can include collecting sawdust 914. Step 914 can include collecting sawdust, and/or any type of byproduct generated subsequent to the step 908. In some examples, step 914 can include collecting, removing and/or disposing sawdust produced during step 908. Step 914 can include collecting and/or cleaning subsequent to step 908, e.g., collecting and/or cleaning sawdust from the automated cutting system. Step 914 can include removing scrap, excess wood materials, and/or byproduct subsequent to step 908. In some embodiments, step 914 can include performing maintenance, to remove excess wood materials, scrap, and/or byproduct from the automated cutting system. The maintenance can include self-maintenance, e.g., maintenance performed independently the automated cutting system alone, and/or guided maintenance, e.g., maintenance procedures guided by an operator. At step 916, the method can include unloading lumber 916. Step 916 can include outputting the cut lumber into an unloading area. Step 916 can include outputting a 2 inch×4 inch wood planks having a length approximately between 2-16 feet. The method for automatically cutting lumber 900 can be used and/or performed by the automated cutting system 100 to boost efficiency of lumber processing, and automate wood panel production by reducing human intervention, and/or reducing external input generally performed in conventional wood panel production.

The method 900 can be partially and/or fully automated. In some embodiments, the automated cutting systems described herein can be used to and/or are configured to perform the steps described in FIG. 9.

Hardware and Software Implementations

Figure 10:
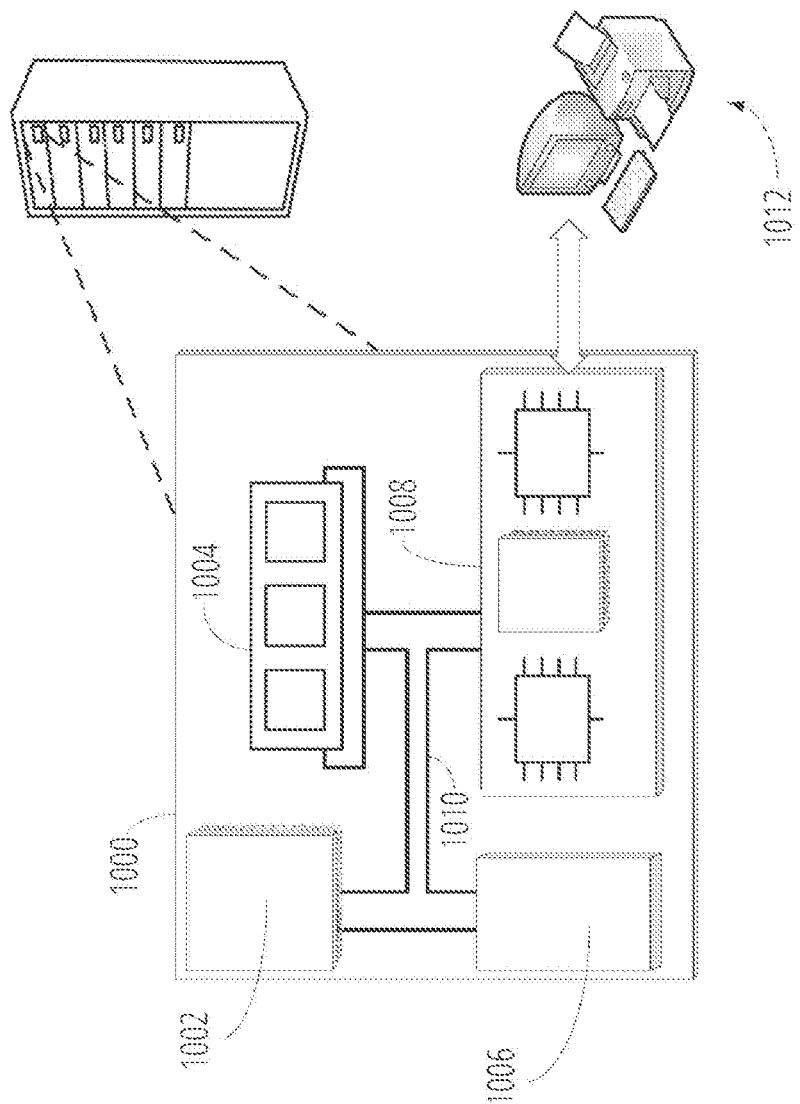
FIG. 10 illustrates a diagram of an exemplary hardware and software systems implementing the systems and methods described herein, according to some embodiments.

FIG. 10 is a block diagram of an example system 1000 that may be used in implementing the technology described in this document. As described herein, the system 1000 can also be referred to as a computer system 1000, among other terms. General-purpose computers, network appliances, mobile devices, or other electronic systems may also include at least portions of the system 1000. The system 1000 includes a processor 1002, a memory 1004, a storage device 1006, and an input/output device 1008. Each of the components 1002, 1004, 1006, and 1008 may be interconnected, for example, using a system bus 1010. The processor 1002 is capable of processing instructions for execution within the system 1000. In some implementations, the processor 1002 is a single-threaded processor. In some implementations, the processor 1002 is a multi-threaded processor. The processor 1002 is capable of processing instructions stored in the memory 1004 or on the storage device 1006.

The memory 1004 stores information within the system 1000. In some implementations, the memory 1004 is a non-transitory computer-readable medium. In some implementations, the memory 1004 is a volatile memory unit. In some implementations, the memory 1004 is a non-volatile memory unit.

The storage device 1006 is capable of providing mass storage for the system 1000. In some implementations, the storage device 1006 is a non-transitory computer-readable medium. In various different implementations, the storage device 1006 may include, for example, a hard disk device, an optical disk device, a solid-date drive, a flash drive, or some other large capacity storage device. For example, the storage device may store long-term data (e.g., database data, file system data, etc.). The input/output device 1008 provides input/output operations for the system 1000. In some implementations, the input/output device 1008 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1012. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1006 may be implemented in a distributed way over a network, for example as a server farm or a set of widely distributed servers, or may be implemented in a single computing device.

Although an example processing system has been described in FIG. 10, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; and magneto optical disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention.

What is claimed is:

1. An automated cutting system, the system comprising:
   a loading module having a robot arm and a conveyor that receives lumber from a loading area and places the lumber on a cutting table and that places cut lumber onto an unloading area;
   an actuating module having at least one of a rack and pinion, a rail, a conveyor, rollers, a piston and a second robot arm, that receives the lumber from the loading module, and that positions the lumber on the cutting table in preparation for cutting;
   a sensor module that detects a position of the lumber on the cutting table, characterizes a curvature of the lumber, and records the curvature of the lumber and the position as lumber information, wherein the sensor is one or more of an optical detector, a photoelectric sensor, an encoder, a linear encoder, or a rotary encoder; and
   a cutting module that cuts the lumber based the lumber information, the cutting resulting in cut lumber wherein the cutting module is one or more of a saw, a circular saw, a cutter and a robot cutter.

2. The automated cutting system of claim 1, wherein the actuating module comprises a drive roller that moves the lumber along the cutting table to position the lumber for cutting.

3. The automated cutting system of claim 1, wherein the actuating module comprises a clamp roller that guides the lumber along the cutting table to position the lumber for cutting.

4. The automated cutting system of claim 1, wherein the loading module comprises a robot arm.

5. The automated cutting system of claim 1, wherein the actuating module comprises at least one of a rack and pinion, a rail, a conveyor, rollers, driver rollers, clamp rollers, passive clamp rollers, a piston, or a robot arm.

6. The automated cutting system of claim 1, wherein the sensor module comprises at least one of an optical detector, a photoelectric sensor, an encoder, a linear encoder, or a rotary encoder.

7. The automated cutting system of claim 1, wherein the cutting module comprises at least one of a saw, a circular saw, a cutter, or a robot cutter.

8. The automated cutting system of claim 1, wherein the unloading module comprises a robot arm.

9. The automated cutting system of claim 1, wherein the cutting table comprises the actuating module and cutting module.

10. The automated cutting system of claim 1, wherein the actuating module moves the lumber along a lateral axis of the cutting table to secure the lumber for cutting.

11. The automated cutting system of claim 1, wherein a computing module controls each of the actuating module, sensor module and cutting module.

12. A method for automatically cutting lumber, the method comprising:
    receiving lumber from a loading area;
    positioning the lumber on a cutting table in preparation for cutting;
    detecting a position of the lumber on the cutting table;
    characterizing a curvature of the lumber;
    recording the curvature of the lumber and the position as lumber information; and
    cutting the lumber to form cut lumber based on the lumber information;
    and
    unloading cut lumber to an unloading area.

13. The method of claim 12, wherein loading lumber comprises using a robot arm to pick-up and place lumber from a receiving area onto a cutting table.

14. The method of claim 12, further comprising analyzing a label on the lumber and generating the lumber information based on the label.

15. The method of claim 12, wherein positioning the lumber comprises positioning the lumber on a cutting table using at least one of a rack and pinion, a rail, a conveyor, rollers, a piston or a second robot arm.

16. The method of claim 12, wherein cutting the lumber comprises using a circular saw to cut the lumber into cut lumber.

17. The method of claim 12, wherein the cut lumber information comprises a size and shape of the cut lumber.

18. The method of claim 12, further comprising applying a label to the cut lumber subsequent to cutting.

19. The method of claim 12, wherein the cut lumber information comprises at least one of a size, shape, type of wood, or date of cut.

20. The method of claim 12, further comprising collecting sawdust generated during the cutting.

* * * * *